United States Patent
Estabrook et al.

(10) Patent No.: US 11,889,320 B2
(45) Date of Patent: Jan. 30, 2024

(54) SYSTEM AND METHOD FOR HOSTING AND TRANSITIONING TO A WIRELESS NETWORK

(71) Applicant: David Clark Company Incorporated, Worcester, MA (US)

(72) Inventors: Mark Estabrook, Acton, MA (US); Sanjay Gupta, Bedford, MA (US)

(73) Assignee: David Clark Company Incorporated, Worcester, MA (US)

( * ) Notice: Subject to any disclaimer, the term of this patent is extended or adjusted under 35 U.S.C. 154(b) by 241 days.

(21) Appl. No.: 17/185,345

(22) Filed: Feb. 25, 2021

(65) Prior Publication Data

US 2022/0272545 A1     Aug. 25, 2022

(51) Int. Cl.
*H04W 16/18*        (2009.01)
*H04W 76/10*        (2018.01)
(Continued)

(52) U.S. Cl.
CPC ........... *H04W 16/18* (2013.01); *H04L 5/14* (2013.01); *H04W 4/10* (2013.01); *H04W 76/10* (2018.02); *H04W 76/30* (2018.02)

(58) Field of Classification Search
CPC ..... H04W 88/06; H04W 84/12; H04W 48/18; H04W 76/10; H04W 76/27; H04W 88/08; H04W 36/08; H04W 36/14; H04W 4/02; H04W 76/15; H04W 76/18; H04W 76/19; H04W 88/04; H04W 92/02; H04W 12/06; H04W 12/08; H04W 12/50; H04W 24/04; H04W 28/10; H04W 36/00; H04W 36/0055; H04W 36/0058; H04W 36/0066; H04W 36/04; H04W 36/18; H04W 36/30; H04W 36/36; H04W 4/00; H04W 4/021;
(Continued)

(56) References Cited

U.S. PATENT DOCUMENTS 9,154,736 B1 * 10/2015 Pan .................. H04W 4/16
10,484,921 B2 * 11/2019 Hao .................. H04W 76/34
(Continued)

FOREIGN PATENT DOCUMENTS

CN     103476092 A * 12/2013
CN     106793157 A * 5/2017 ............. A63F 13/32
(Continued)

OTHER PUBLICATIONS

Wayback Machine, www.livetours.com/faq/, Aug. 7, 2020, retrieved Dec. 15, 2020, pp. 1-7 (Year: 2020).*
(Continued)

*Primary Examiner* — Matthew C Sams
(74) *Attorney, Agent, or Firm* — Burns & Levinson LLP; Steven M. Mills (57) ABSTRACT

A system and method allows for communication between mobile devices running a communication application. The mobile devices include a host device and a plurality of client devices. When there is limited connectivity to other networks, the host device creates a host network and the client devices are transitioned to the host network. After the client devices are transitioned to the host network, communication can occur between the host device and the client devices, through the communication application and over the host network.

22 Claims, 4 Drawing Sheets

(51) Int. Cl.
 *H04L 5/14* (2006.01)
 *H04W 76/30* (2018.01)
 *H04W 4/10* (2009.01)
(58) Field of Classification Search
 CPC ......... H04W 4/029; H04W 4/16; H04W 4/24; H04W 48/16; H04W 56/001; H04W 72/04; H04W 72/085; H04W 76/16; H04W 76/25; H04W 76/30; H04W 76/34; H04W 8/005; H04W 8/02; H04W 84/06; H04W 88/02; H04W 88/14; H04W 88/16; H04W 92/045; H04W 92/18; H04W 92/20; H04B 1/04; H04B 1/16; H04B 1/40; H04B 1/713; H04B 1/715; H04B 1/7156; H04B 17/318; H04L 1/203; H04L 12/14; H04L 12/1403; H04L 12/145; H04L 2101/622; H04L 43/0811; H04L 43/16; H04L 5/16; H04L 63/08; H04L 65/1016; H04L 65/1059; H04L 65/1069; H04L 65/1094; H04L 65/403; H04L 65/4061; H04L 65/61; H04L 65/611; H04L 65/612; H04L 65/80; H04L 67/104; H04L 67/306; H04L 69/161; H04L 69/22; H04M 1/2535; H04M 1/271; H04M 1/724; H04M 1/72463; H04M 15/00; H04M 15/58; H04M 15/8214; H04M 2203/5054; H04M 3/38; H04M 3/56; H04N 7/148; H04N 7/15
 See application file for complete search history.

(56) References Cited

U.S. PATENT DOCUMENTS

| | | | | |
|---|---|---|---|---|
| 11,418,559 | B2* | 8/2022 | Tissot-Dupont | H04L 65/611 |
| 11,445,457 | B2* | 9/2022 | Tissot-Dupont | H04L 5/16 |
| 2006/0019689 | A1* | 1/2006 | Pantalone | H04M 1/724 |
| | | | | 455/518 |
| 2012/0170726 | A1* | 7/2012 | Schwartz | H04M 3/56 |
| | | | | 379/93.02 |
| 2014/0250513 | A1* | 9/2014 | Cao | H04W 12/50 |
| | | | | 726/7 |
| 2015/0172968 | A1* | 6/2015 | Lund | H04M 1/72463 |
| | | | | 455/437 |
| 2015/0351019 | A1* | 12/2015 | Leonov | H04W 4/02 |
| | | | | 370/338 |
| 2016/0057602 | A1* | 2/2016 | Rayanki | H04W 8/005 |
| | | | | 370/254 |
| 2016/0227496 | A1* | 8/2016 | Panteleev | H04W 28/08 |
| 2017/0303238 | A1* | 10/2017 | Fodor | H04W 72/02 |
| 2019/0124716 | A1* | 4/2019 | Hapsari | H04W 72/04 |
| 2019/0273531 | A1* | 9/2019 | Waxman | H04B 1/715 |
| 2020/0204467 | A1* | 6/2020 | Yu | H04M 15/8214 |
| 2021/0136859 | A1* | 5/2021 | Yoo | H04W 76/25 |
| 2021/0211902 | A1* | 7/2021 | Achyuth | H04W 76/19 |
| 2022/0015174 | A1* | 1/2022 | Aramoto | H04W 76/18 |

FOREIGN PATENT DOCUMENTS

| | | | | |
|---|---|---|---|---|
| EP | 3863369 | A1 * | 8/2021 | ............ H04W 76/15 |
| GB | 2605830 | A * | 10/2022 | ............ H04W 48/18 |

OTHER PUBLICATIONS

Wayback Machine, www.livetours.com/instructions/, Aug. 7, 2020, retrieved Dec. 15, 2020, pp. 1-4 (Year: 2020).*
Wayback Machine, www.livetours.com/tour-guide/, Aug. 2020, retrieved Dec. 15, 2020, pp. 1-8 (Year: 2020).*
https://apps.apple.com/us/app/walkie-talkie-peer-to-peer/id1181349764. Accessed Feb. 19, 2021. 4 pages.
https://www.livetours.com/faq/. Accessed Feb. 19, 2021.15 pages.
https://www.gl-inet.com/products/gl-ar750s/. Accessed Feb. 19, 2021. 10 pages.

* cited by examiner

SYSTEM AND METHOD FOR HOSTING AND TRANSITIONING TO A WIRELESS NETWORK

FIELD OF THE TECHNOLOGY

The subject disclosure relates to communication systems and more particularly to systems allowing for communication between devices in areas with limited wireless network coverage.

BACKGROUND OF THE TECHNOLOGY

At present, many individuals carry mobile devices, such as smartphones, laptops, and the like, which include built in communication and wireless capabilities. Many mobile devices can operate low cost push to talk or full duplex wireless intercom systems. To connect with other devices, these devices often rely on the availability of a network (e.g. cellular or broadband) covering their area to facilitate the transmission of that communication. While in this process is effective in many situations, communication in this way is not possible when there is no cellular or broadband network (e.g. Wi-Fi).

Smartphones, and other devices, can sometimes create Wi-Fi hot-spots to tether devices to an internet connection. For example, in some instances, there may be no local internet connection available via Ethernet or Wi-Fi (e.g. through a router). Using a smartphone connected to the internet via cellular link, the smartphone Wi-Fi can be configured as a Wireless Access Point (WAP)/router to allow other devices (for example phones, tablets, or PCs) without cellular connectivity to connect to the smartphone via Wi-Fi and use the smartphone's cellular link to connect to the internet. In some cases, these devices may also use voice-over-IP (VoIP), but connect to the internet to achieve a VoIP two way communication link. The additional pathways associated with the internet connection will increase latencies of the system. A fundamental limitation of this solution is that it requires at least one device connected to an outside network to provide the internet connectivity required for communication.

In other instances, some devices can be configured to allow for a direct connection for communication between two devices, similar to walkie-talkies. However, such devices are limited in that they do not allow for communication in real time.

SUMMARY OF THE TECHNOLOGY

In light of the needs described above, in at least one aspect, there is a need for a communication system and method which facilitates real time communication between devices, even when those devices move to an area with poor connectivity, or no connectivity, to wireless networks.

In at least one aspect, the subject technology relates to a method of communicating between mobile devices. The method includes creating, by a server, a first network creating a first local coverage area. A plurality of mobile devices connect to first network, the mobile devices including a host device and a plurality of client devices. The host device creates a host network creating a second local coverage area and allowing audio communication over the network and through a communication application. The client devices are transitioned, from the first network to the host network. The transition includes disconnecting devices from the first network and connecting them to the host network. After the client devices transition to the host network, audio communication from the host device is provided to the client devices through the communication application.

In some embodiments, the method includes directing the client devices to wireless credentials for connecting to the host network. The host device can then create a communication session for communication over the host network and through the communication application, wherein the wireless credentials allow the client devices to connect to the host network while the communication session is active. In some cases, during the communication session, whenever a client device loses connectivity to the host network, the communication application causes said client device to continue to look for the host network and reconnect to the host network when the host network is found. In some cases, the communication application causes each client device to connect to the host network during a portion of the communication session regardless of connectivity to the first network, the internet, or any other network.

In some embodiments, during the communication session, the host device searches for internet connectivity and, when the host device establishes internet connectivity, the host device communicates wireless credentials for connecting to the internet to the client devices and terminates the host network. In some cases, the communication application is configured to broadcast data from the host device to all client devices during the communication session. In some cases, the communication application is configured to identify whenever one of the client devices loses connectivity to the host network and, when one of the client devices loses connectivity to the host network, provide a notification to the host device.

In some embodiments, the communication application allows communication from the host device via IP based audio to the client devices over the host network. In some cases, the communication application allows for push-to-talk communication from the client devices to the host device over the host network. In some cases, the communication application allows for full duplex communication between the host device and the client devices over the host network. In some cases, the host network runs in infrastructure mode, where all devices on the network communicate through a single access point, such as a wireless router.

In some embodiments, a second host device hosts a second host network creating a third local coverage area, the second host network allowing audio communication over the second host network. Further, during the communication session, whenever a client device loses connectivity to the host network, said client device can then attempt to connect to the second host network.

In some embodiments, the method includes determining, by the host device, performance of the host device on the first network, wherein the step of transitioning, by the client devices, from the first network to the host network, occurs when the performance falls below a predetermined threshold for at least one performance metric. In some cases, the step of hosting the host network by the host device is carried out while the host device is connected to the first network. In some cases, after transitioning the client devices to the first network, the method includes checking for connectivity to an additional Wi-Fi network by the host device. Further, when connectivity to the additional Wi-Fi network is detected, the method can include transitioning the client devices from the host network to the additional Wi-Fi network.

In at least one aspect the subject technology relates to a method of communicating between a plurality of mobile devices including a host device and a client device. The method includes detecting connectivity to external networks, by the host device, and when connectivity is below a predetermined threshold, hosting a host network. The host network creates a local coverage area allowing audio communication over the host network through a communication application. The client devices then obtain wireless credentials allowing the client devices to connect to the host network.

In at least one aspect, the subject technology relates to a communication system for communication between mobile devices. The system includes a plurality of mobile devices including a host device and a plurality of client devices. A server creates a first network creating a first local coverage area. The mobile devices are configured to connect to the first network when in the first local coverage area. When connectivity to the first network falls below a predetermined threshold, the host device is configured to transition the client devices from the first network to a host network created by the host device. The host network creates a second local coverage area allowing audio communication over the host network through a communication application on each mobile device.

In some embodiments, the host device is further configured to create a communication session for communication over the host network and through the communication application and direct the client devices to wireless credentials for connecting to the host network while the communication session is active. During the communication session, whenever a client device loses connectivity to the host network, the communication application can be configured to cause said client device to continue to look for the host network and reconnect to the host network when the host network is found.

In some embodiments, the host device is further configured to search, during the communication session, for internet connectivity. When the host device establishes internet connectivity, the host device can then communicate wireless credentials for connecting to the internet to the client devices and terminate the host network. In some embodiments, the communication application is configured to broadcast data from the host device to all client devices during the communication session. In some cases, the communication application is configured to identify whenever one of the client devices loses connectivity to the host network and, when one of the client devices loses connectivity to the host network, provide a notification to the host device.

In some embodiments, the communication application allows communication from the host device via IP based audio to the client devices over the host network. In some cases, the communication application allows for one or more of the following: push-to-talk communication from the client devices to the host device over the host network; or full duplex communication between the host device and the client devices over the host network.

In some embodiments, the system includes a second host device, the second host device configured to create a second host network creating a second local coverage area. The second host network allows audio communication over the second host network. The client devices can then be configured such that, during the communication session, whenever a client device loses connectivity to the host network, said client device connects to the second host network.

BRIEF DESCRIPTION OF THE DRAWINGS

So that those having ordinary skill in the art to which the disclosed system pertains will more readily understand how to make and use the same, reference may be had to the following drawings.

DETAILED DESCRIPTION

The subject technology overcomes prior art difficulties in maintaining a communication session between devices in an area with poor wireless network coverage. In brief summary, the subject technology provides a system and method that allows for continued communication between devices even when a network is unavailable. The advantages, and other features of the systems and methods disclosed herein, will become more readily apparent to those having ordinary skill in the art from the following detailed description of certain preferred embodiments taken in conjunction with the drawings which set forth representative embodiments of the present invention. Like reference numerals are used herein to denote like parts. Further, words denoting orientation such as "upper", "lower", "distal", and "proximate" are merely used to help describe the location of components with respect to one another. For example, an "upper" surface of a part is merely meant to describe a surface that is separate from the "lower" surface of that same part. No words denoting orientation are used to describe an absolute orientation (i.e. where an "upper" part must always be at a higher elevation.

Figure 1:
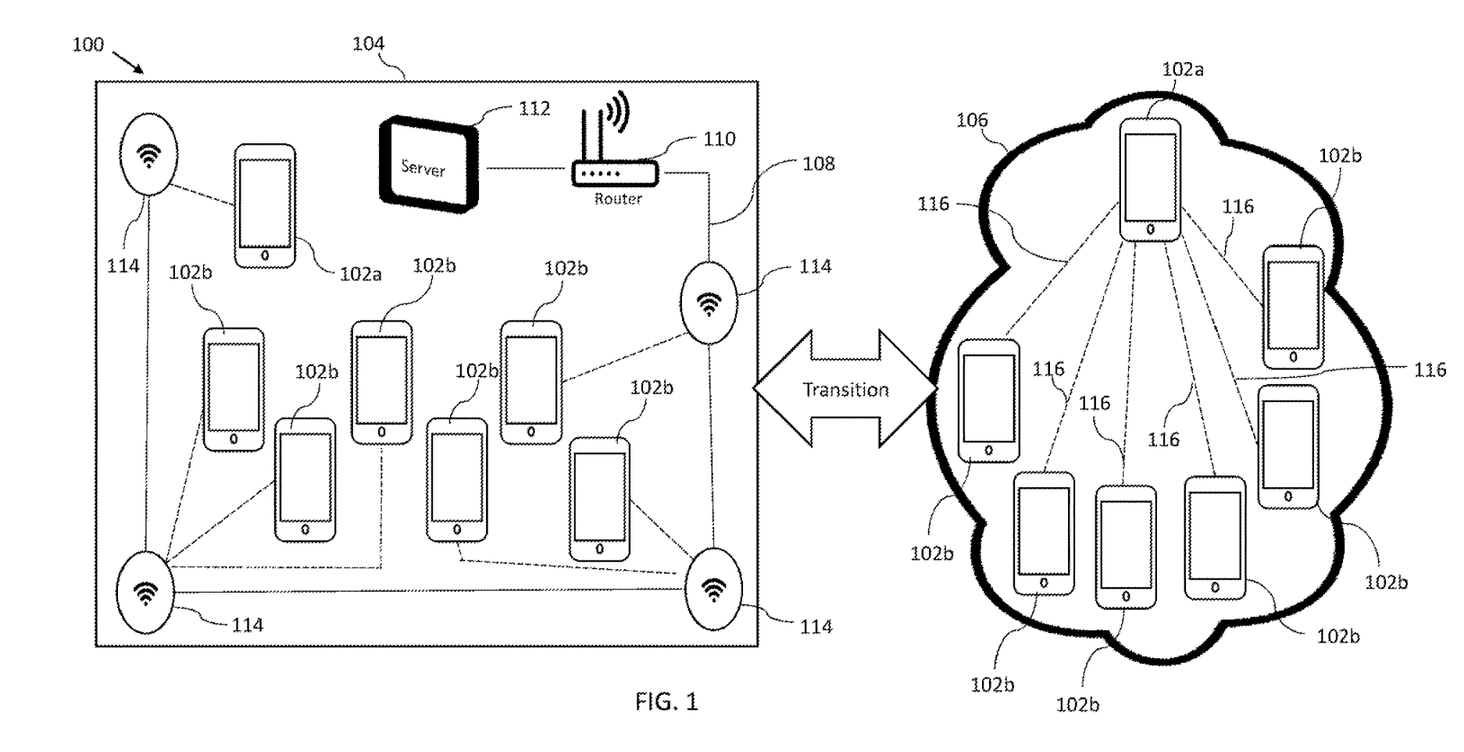
FIG. 1 is a schematic diagram of a communication system in accordance with the subject technology.

Referring now to FIG. 1, a schematic diagram of a communication system 100 in accordance with the subject technology is shown. The communication system 100 is designed to allow for communication between mobile devices 102a, 102b (generally 102). In particular, as will be described in more detail below, the communication system 100 is designed to allow for full duplex, real time, low latency communication between mobile devices 102 even in areas where there is limited, or no, connectivity to cellular networks or the internet (i.e. the Internet, or other wireless network).

In the example given, the system 100 is shown being implemented in an environment with two separate areas 104, 106. The first area 104 can be a gathering area, such as an entryway in a museum, where users initially gather before a tour. The first area 104, includes a local network 108 which can be connected to the internet, an intranet, or the like. To that end, the network 108 in the first area is formed by a series of devices, including a router 110 connected to a communication application server 112. The communication application server 112 can run an application to allow wireless real-time, full duplex, multi-party, multimedia communication between devices 102. The communication application server 112 can manage connections between devices 102 in the first area 104 and may also provide multimedia mixing. The router 110 is wirelessly connected to a series of wireless access points 114 (WAPs) which generally facilitate communication between the communication application server 112 and the communication devices 102 by extending the network 108 coverage throughout the area 104. The WAPs 114 transmit and receive data to and from the devices 102 using a wireless local area network technology, for example WiFi 802.11 standard, and route traffic as needed utilizing specified transportation methods including IP transport. The network 108 functions in infrastructure mode, with all devices 102 communicating through the router 110. In some cases, the first area 104 may additionally, or alternatively, be an area where users are likely to have good reception to cellular networks. It should be understood that the system 100 can also include other typical networking and/or communication hardware as needed even though not shown herein.

A number of people within the area have mobile devices 102 which can be used for communication. The mobile devices 102 can be any type of mobile device capable of running an application to facilitate communication as particularly described herein. For example, mobile devices such as smartphones running an iOS or Android operating system can effectively carry out the functions of a mobile device 102 within the system 100. However, other mobile devices could be used additionally, or alternatively, to smartphones. For example, in some cases, the mobile devices 102 can include laptops, tablets, or PCs. Due to the availability of the network 108 (and/or to the availability of cellular networks) in the first area 104, users can typically communicate using their mobile devices 102.

In contrast to the first area 104, the second area 106 is a location which is not within the coverage of an existing network (or an area where service is poor). For example, where the first area 104 is the lobby of a museum where a tour will be conducted, the second area 106 might be within an exhibit of the museum which is outside of the coverage area of the network 108 or cellular networks. Notably, a museum is only one example of a location where the system 100 described herein may be effectively implemented, and it should be understood that the system 100 is also well suited for other environments. As the users move from the lobby (e.g. the first area 104) into the museum exhibit area (e.g. second are 106), their mobile devices 102 will lose connectivity to the original network 108. The users will be unable to communicate via either the network 108 or a cellular network. In particular, the tour will usually include a guide, or host, whose mobile device is denoted the host device 102a herein. The tour attendees will have mobile devices which are referred to herein as client devices 102b. To facilitate the tour, it is beneficial for the host device 102a to be able to convey information to the client devices 102b, allowing the host to act as a tour guide and explain exhibits as the users move through the museum. Further, in some cases, it may also be beneficial for client devices 102b to be able to communicate back to the host device 102a, and/or for client devices 102b to be able to communicate between one another, during the tour.

To ensure communication throughout the tour, the host device 102a is configured with the ability to host a local network 116. The host network 116 is designed to create a local coverage area (e.g. within area 106), allowing for the communication and/or other transfer of data between the mobile devices 102 connected to the host network 116. It can be advantageous for the host device 102a to be a smartphone or the like, such that the host device 102a can rely on the inherent capability to act as a wireless access point between itself and other mobile devices 102 in order to create the host network 116. This capability allows the host device 102a to connect with the client devices 102b using various connection modalities, such as Wi-Fi, USB, or Bluetooth. Communication over the host network 116 can also be facilitated through a communication application, such as a smartphone application. The communication application is initially downloaded onto all mobile devices 102. This can be done utilizing the network 108 in the first area 104 while the users are gathering for the tour, or at some other location prior to the tour starting.

Once the devices 102 are connected to the host network 116, the communication application can handle the transmission of receipt of audio (or other data, if desirable) over the host network 116, allowing for communication from the host device 102a to the client devices 102b. The communication application may further provide a user interface via a display of each mobile device 102. Through the host device 102a and communication application, the system 100 facilitates a smooth transition from the first network 108 to the host network 116 as the users (and devices 102) move from the gathering area 104 to the exhibit area 106.

Figure 2:
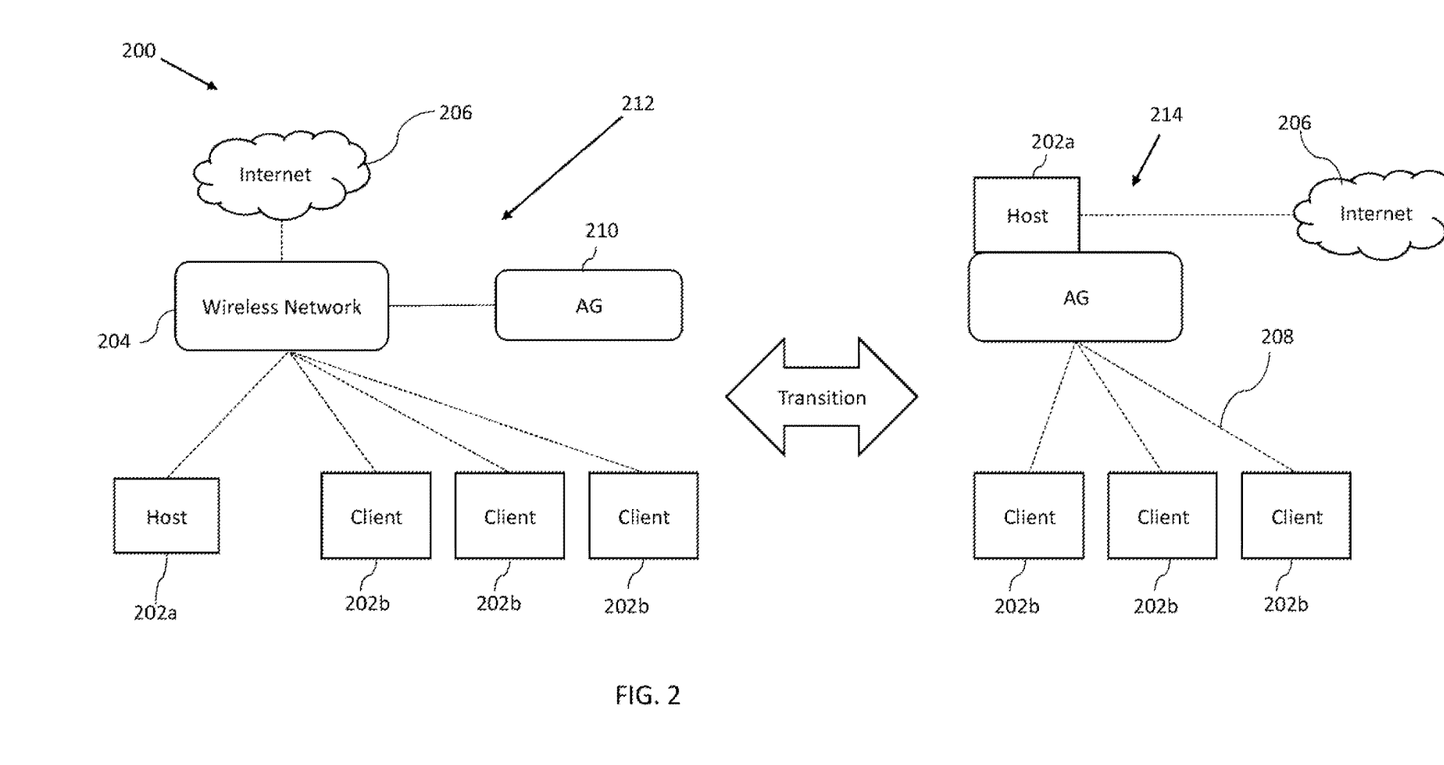
FIG. 2 is a block diagram of a system for communication between devices showing a transition between networks in accordance with the subject technology.

Referring now to FIG. 2, a block diagram of the system 200 shows the communication between devices 202a, 202b (generally 202) as the client devices 202b transition from a wireless network 204 connected to the internet 206 to a host network 208 created by a host device 202a. The wireless network 208 operates in infrastructure mode, with all devices 202 connecting to a shared audio gateway (AG) 210. The AG 210 is an audio interface allowing for communication between devices 202 connected to the network 208. Through the host network 208, the host device 202a can create a communication session for a given period (e.g. a tour through a museum). At some point prior to the transition to the host network 208, credentials for connecting to the host network 208 are communicated to each client device 202b. In some cases, credentials can be communicated to the client devices 202b by the host device 202a. In other cases, the client devices 202b can be directed to a location, through the communication application or otherwise, where the credentials are stored. After receipt, the client device 202b can then acknowledge the receipt of credentials.

The host device 202a can look to various criteria when making the determination of whether to make the host network 208 available and allow a transition of the client devices 202b from the first network 204 to the host network 208 during the communication session. To avoid unnecessary work by the host device 202a, the host device 202a can be figured to only generate the host network 208 once a transition to the host network 208 is desired. In some cases, the transition can occur once the host device 202a recognizes its performance on the first network 204 falling below a certain threshold. The performance threshold can be measured by various criteria related to network performance, such as jitter, latency, packet loss, or a received signal strength indicator. To facilitate a smooth transition, the host device 202a can create the host network 208 while still connected to the first network 204. Once the host device 202a seeks to begin the transition, the host device 202a creates the host network 208. The host device 202a can then receive join requests from the client devices 202b, and can provide wireless credentials to client devices 202b as needed. Through the host network 208, the devices 202 can communicate after moving from the first area 212 to a second area 214, even when the first network 204, or other cellular or internet connections, are unavailable.

The communication application and host network 208 can facilitate different types of data transfer over the network 208 depending on the desired application. Additionally, the host device 202a can act as an audio gateway for communication. In most cases, the host device 202a will be able to send audio communication to the client devices 202b, which can be done via IP based audio. The host device 202a can either broadcast audio to all client devices 202b, or alternatively, can communicate with individual client devices 202b as needed. This can be advantageous, particularly when the host device 202a is controlled by a group leader, or tour guide. For example, if the host device 202a is used by a tour guide during a museum tour, communication from the host device 202a to the client devices 202b can allow the tour guide to explain exhibits as the tour is in progress, and even in areas with no external network available. In some instances, the host network 208 allows for full duplex communication, with client devices 202b being able to communicate back to the host device 202a, via push-to-talk or continuously. Further, depending on the desired application, the host network 208 can additionally be configured to allow for communication between client devices 202b (e.g. allowing members of a tour to communicate with one another). If desired, client devices 202b can be divided into a number of different groups during a given communication session. The host device 202a can either communicate to all clients 202b, or to specific groups of clients 202b within the session. Similarly, where communication between client devices 202b is enabled, the communication application may allow client devices 202b to communicate within specific groups within the communication session. Yet further, in some instances, the communication application can allow for other types of data transfer between the devices 202.

After transitioning to the host network 208, the host device 202a can continue to look for connectivity to the first network 204, or to another internet 206 connected network, and be prepared to effectuate a transition back to the first network 204 or internet 206 once available. For example, once internet connectivity is detected by the host device 202a, the host device 202a can communicate credentials to each client device 202b on the host network 208 for connecting to the network providing the internet 206. The client devices 202b then acknowledge receipt of credentials, confirming their ability to transition from the host network 208 to the internet 206. The host device 202a then informs the client devices 202b of the transition to internet mode, terminates the host network 208, and transitions to the internet connection. In general, the client devices 202b will then also transition to internet mode. However, in some cases, one or more client devices 202b may also connect to other known and/or available networks, or may rejoin a separate ongoing group (e.g. a separate host network). During the transition process, if one or more client devices 202b cannot be found, a "lost client" notification can optionally be provided to the host device 202a. In some cases, the communication application can be configured to cause each client device 202b to connect to the host network 204 for part of the communication session regardless of the availability of a connection to the first network 204, the internet 206, or to any other external network. This allows the host device 202a to communicate directly with the client devices 202b at the operative part of the communication session even if the host device 202a has no connectivity to an outside network. Further, during a communication session, the communication application can also cause client devices 202b to continue to look for the host device 202a wireless signal whenever the client device 202b loses connectivity to the host application. Therefore whenever the client device 202b re-enters the coverage area of the host network 208, the client device 202b automatically rejoins the host network 208 and participates in the communication session.

Notably, while a guided museum tour is used by way of example, it should be understood that the systems and methods disclosed herein are suitable for individuals to use in a wide variety of circumstances. Other examples include use by a biking, walking, running, or hiking group, or any other group of multiple people journeying through an area with poor connectivity to wireless networks.

Figure 3:
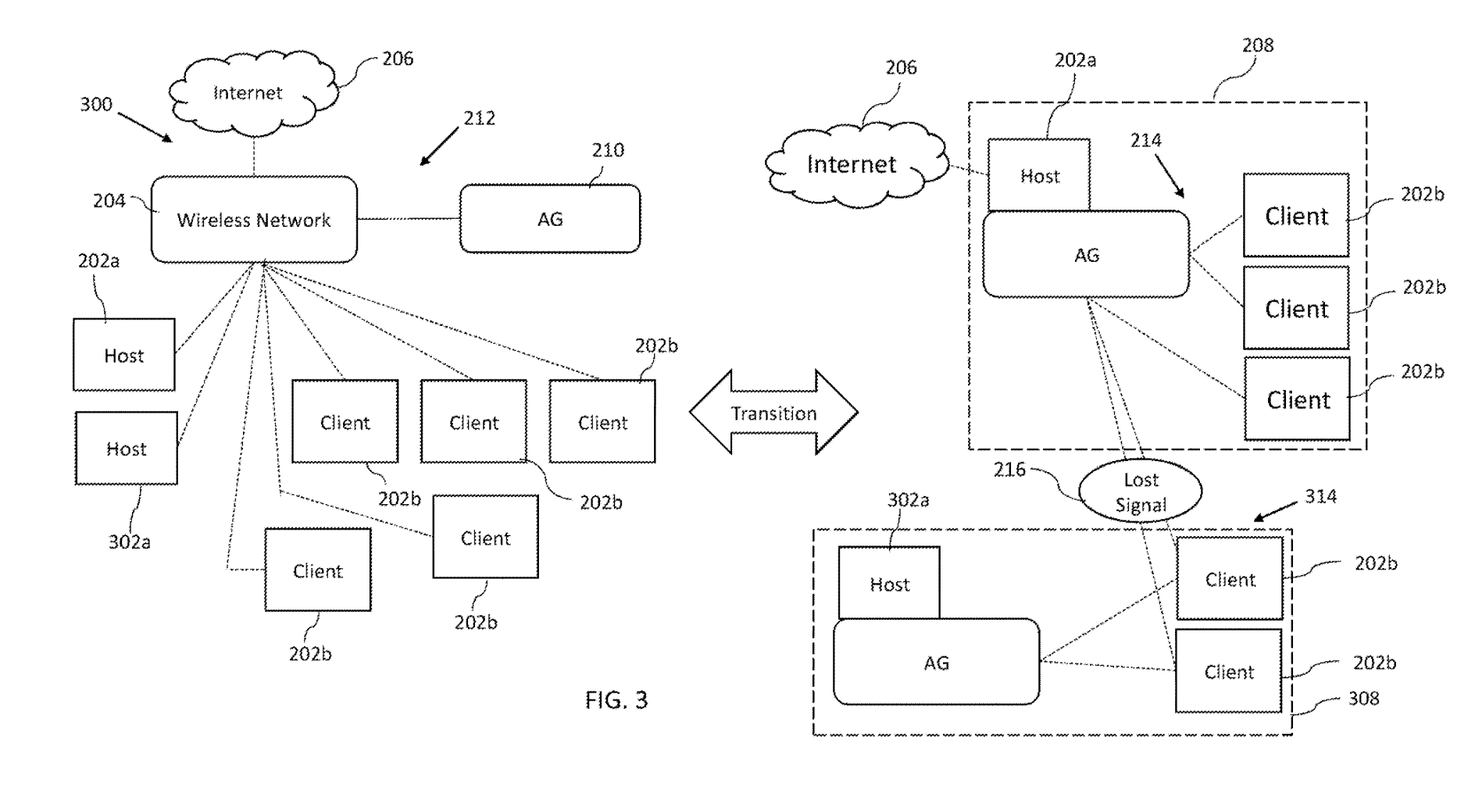
FIG. 3 is another block diagram of a system for communication between devices showing a transition between networks in accordance with the subject technology.

Referring now to FIG. 3, another block diagram a system 300 in accordance with the subject technology is shown. FIG. 3 depicts communication between devices 202, 302a of the system as the client devices 202b transition from a wireless network 204 connected to the internet 206 to a host network 208 created by a host device 202a. The system 300 acts similar to the system 200, except as otherwise shown and described herein. In particular, the system 300 includes a second host device 302a which hosts a second host network 308.

The second host device 302a can function similarly to the first host device 202a, and can be controlled by a host who intends to set up a second host network 308 to transition clients 202b to. Therefore, after the transition from the first network 204, the first host device 202a can provide a host network 208 with a first coverage area, while the second host device 302a provides a second host network 308 within a separate coverage area 314. Like the first host device 202a the second host device 302a can function as an audio gateway, allowing for communication between devices 302a, 202b within the coverage area 314. This can have a number of advantages. First, after the transition, if a client device 202b strays out of the coverage area 214 of the first host network 208, losing the connection to the first host device 202a (see e.g. lost signal indicator 216), the client device 202b may be able to connect to the second host network 308 if within the coverage area 314 of the second host device 302a. Thus, if two tours are being held simultaneously, lost clients 202b may be able to seamlessly join up with the tour run by the second host 302a. Alternatively, a number of host devices 202a, 302a could be located around the museum to provide audio to client devices 202b in various particular areas. In the example shown in FIG. 3, when two client devices 202b experience a lost signal 216 to the first host network 208 they are able to join the second host network 308.

Figure 4:
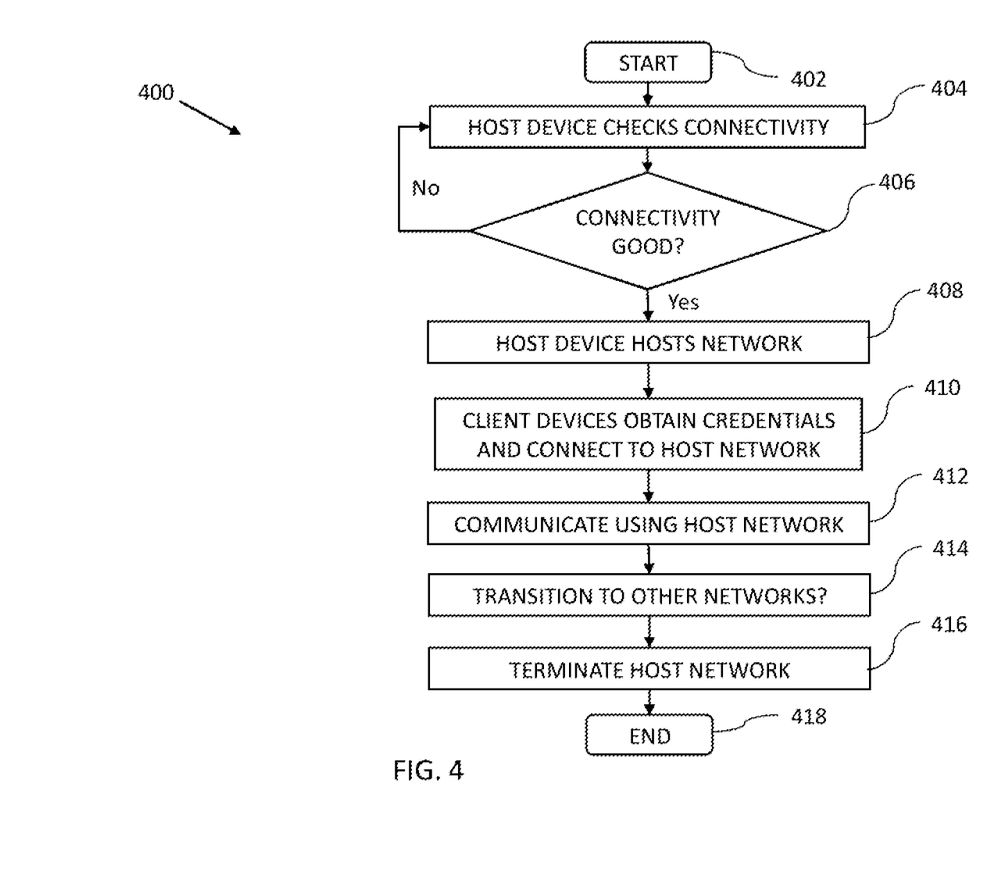
FIG. 4 is a flowchart of a method for creating a host network, and transitioning between networks in accordance with the subject technology.

Referring now to FIG. 4, a flowchart of a method 400 of establishing a host local network in accordance with the subject technology is shown. The method 400 can be carried out using the system 100, 200, 300 as described herein. It should be noted that, in some cases, the systems and methods disclosed herein can operate even in circumstances where there is no initial gathering area with Wi-Fi service or a cellular network present. As an example, a number of individuals may participate in a guided hiking tour through an area with no connectivity, and the systems and methods described herein may be utilized to allow the individuals to communicate during the tour.

The method begins, at step 400, with the start of the tour or/and communication session. At step 402, the host device then checks connectivity to external networks, such as cellular networks and Wi-Fi networks and makes a determination as to whether there is good connectivity to an external network at step 404 and a determination is made as to whether connectivity is good 406. If and when connectivity is below a predetermined threshold, the host device can begin hosting the host network, as otherwise described herein, at step 408. The host network will provide a local coverage area to connected devices. Prior to joining the host network, client devices will obtain credentials for connecting to the host network, at step 410, and connect to the host network. Once connected, at step 412, the host device and communication application will then allow devices to communicate over the host network, in one or more of the ways described herein. Further, as the tour continues, the host device can optionally continue to look for opportunities to transition the devices to other available networks with good connectivity, such as a Wi-Fi network, at step 414. Finally, at step 416, the communication session and the host network can be terminated at the end of the tour, and/or after a transition to another network. The method 400 then ends at step 418.

In this way, the systems and methods described herein can facilitate a smooth transition between various networks and a host network generated from a mobile device. This can ensure ongoing communication from the host device to a number of additional mobile devices connected to the host device. It should be understood that while various exemplary implemented are shown and described by way of example, one skilled in the art should understand that systems and methods disclosed herein may be carried out using other components, and utilized in different environments than those particularly described.

All orientations and arrangements of the components shown herein are used by way of example only. Further, it will be appreciated by those of ordinary skill in the pertinent art that the functions of several elements may, in alternative embodiments, be carried out by fewer elements or a single element. Similarly, in some embodiments, any functional element may perform fewer, or different, operations than those described with respect to the illustrated embodiment. Also, functional elements shown as distinct for purposes of illustration may be incorporated within other functional elements in a particular implementation.

While the subject technology has been described with respect to preferred embodiments, those skilled in the art will readily appreciate that various changes and/or modifications can be made to the subject technology without departing from the spirit or scope of the subject technology. For example, each claim may depend from any or all claims in a multiple dependent manner even though such has not been originally claimed. Additionally, the subject technology includes methods of carrying out the functions of the system as described herein.

What is claimed is:

1. A method of communicating between mobile devices comprising:
    creating, by a server, a first network creating a first local coverage area;
    connecting, by a plurality of mobile devices, to first network, the mobile devices including a host device and a plurality of client devices;
    hosting, by the host device, a host network creating a second local coverage area allowing audio communication over the host network through a communication application;
    providing to the client devices, through the communication application and over the first network, wireless credentials for connecting to the host network;
    creating, by the host device, a communication session for communication over the host network and through the communication application, wherein the wireless credentials allow the client devices to connect to the host network while the communication session is active;
    transitioning, by the client devices, from the first network to the host network, transitioning including disconnecting from the first network and immediately connecting to the host network after connectivity to the first network falls below a threshold; and
    after the client devices transition to the host network, providing audio communication, from the host device, to the client devices through the communication application.

2. The method of claim 1, wherein, during the communication session, after a client device loses connectivity to the host network, the communication application causes said client device to continue to look for the host network and reconnect to the host network when the host network is found.

3. The method of claim 1, wherein, the communication application causes each client device to connect to the host network during a portion of the communication session regardless of connectivity to the first network, the internet, or any other network.

4. The method of claim 1, wherein, during the communication session, the host device searches for internet connectivity and, once the host device establishes internet connectivity, the host device communicates wireless credentials for connecting to the internet to the client devices and terminates the host network.

5. The method of claim 1, wherein the communication application is configured to broadcast data from the host device to all client devices during the communication session.

6. The method of claim 1, wherein the communication application is configured to identify whenever one of the client devices loses connectivity to the host network and, when one of the client devices loses connectivity to the host network, provide a notification to the host device.

7. The method of claim 1, wherein the communication application allows communication from the host device via IP based audio to the client devices over the host network.

8. The method of claim 1, wherein the communication application allows for push-to-talk communication from the client devices to the host device over the host network.

9. The method of claim 1, wherein the communication application allows for full duplex communication between the host device and the client devices over the host network.

10. The method of claim 1, wherein the host network runs in infrastructure mode.

11. The method of claim 1, further comprising:
    hosting, by a second host device, a second host network creating a third local coverage area, the second host network allowing audio communication over the second host network; and
    during the communication session, whenever a client device loses connectivity to the host network, attempting, by said client device, to connect to the second host network.

12. The method of claim 1, further comprising:
    determining, by the host device, performance of the host device on the first network, wherein the step of transitioning, by the client devices, from the first network to the host network, occurs after the performance falls below a predetermined threshold for at least one performance metric.

13. The method of claim 1, wherein the step of hosting the host network by the host device is carried out while the host device is connected to the first network.

14. The method of claim 1, further comprising:
after transitioning the client devices to the host network, checking for connectivity to an additional Wi-Fi network by the host device, and, after connectivity to the additional Wi-Fi network is detected, transitioning the client devices from the host network to the additional Wi-Fi network.

15. A communication system for communication between mobile devices comprising:
a server creating a first network creating a first local coverage area, wherein the mobile devices are configured to connect to the first network when in the first local coverage area; and
a plurality of mobile devices including a host device and a plurality of client devices, the host device configured to create a communication session for communication over the host network and through the communication application, wherein the client devices are provided, through the communication application and over the first network, wireless credentials for connecting to the host network while the communication session is active,
wherein:
after connectivity to the first network falls below a predetermined threshold, the host device is configured to immediately transition the client devices from the first network to a host network created by the host device, the host network creating a second local coverage area allowing audio communication over the host network through a communication application on each mobile device; and
during the communication session, whenever a client device loses connectivity to the host network, the communication application is configured to cause said client device to continue to look for the host network and reconnect to the host network when the host network is found.

16. The system of claim 15, wherein the host device is further configured to:
search, during the communication session, for internet connectivity; and
when the host device establishes internet connectivity, the host device communicates wireless credentials for connecting to the internet to the client devices and terminates the host network.

17. The system of claim 15, wherein the communication application is configured to broadcast data from the host device to all client devices during the communication session.

18. The system of claim 15, wherein the communication application is configured to identify whenever one of the client devices loses connectivity to the host network and, when one of the client devices loses connectivity to the host network, provide a notification to the host device.

19. The system of claim 15, wherein the communication application allows communication from the host device via IP based audio to the client devices over the host network.

20. The system of claim 15, wherein the communication application allows for one or more of the following:
push-to-talk communication from the client devices to the host device over the host network; or
full duplex communication between the host device and the client devices over the host network.

21. The system of claim 15, further comprising a second host device, the second host device configured to create a second host network creating a second local coverage area, the second host network allowing audio communication over the second host network,
wherein, during the communication session, the client devices are configured such that whenever a client device loses connectivity to the host network, said client device connects to the second host network.

22. The system of claim 15, further comprising after the mobile devices have connected to the first network and prior to the host device creating the host network, providing audio communication, from the host device, to the client devices through the communication application over the first network.

* * * * *